Figure 1:
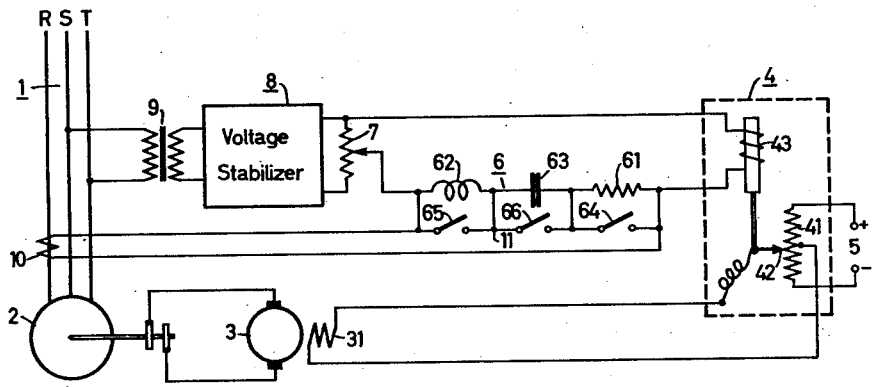

June 4, 1957  J. C. HENNING  2,794,947
VOLTAGE REGULATING APPARATUS FOR ALTERNATORS
IN PARALLEL OPERATION
Filed Aug. 14, 1953

Inventor:
Johann Christian Henning

United States Patent Office 2,794,947
Patented June 4, 1957

2,794,947

VOLTAGE REGULATING APPARATUS FOR ALTERNATORS IN PARALLEL OPERATION

Johann Christian Henning, Beiersdorf, Germany, assignor to Siemens-Schuckertwerke Aktiengesellschaft, Berlin-Siemensstadt, Germany, a German corporation Application August 14, 1953, Serial No. 374,218

Claims priority, application Germany August 23, 1952

9 Claims. (Cl. 322—25)

My invention relates to the voltage regulation of alternators for feeding a distribution network in parallel operation.

For the voltage regulation of alternators in parallel operation, astatic regulators or static regulators of an only slightly static characteristic have been used together with devices that convert the voltage regulation into a current regulation. Such devices afford an accurate operation only if the voltage impressed upon the condition-responsive mechanism of the regulator is constant. In most distribution systems, this condition cannot always be satisfied because of the usually unfavorable power factor conditions at various points of the system. In cases where the wattless power reserve is ample, the resulting regulating errors can be corrected by manual adjustments based upon observation of measuring instruments, provided the line voltage fluctuations are slow. In many cases, however, the line voltage may become disquiet to such an extent that it is infeasible in this manner to maintain a given desired relation between the active and reactive current components.

Systems are also known for maintaining the wattless current constant independently of line voltage variations in an alternator connected in parallel with other alternators on a transmission line. In such systems a constant datum voltage derived from a voltage stabilizer connected across two phases of the three-phase transmission system is combined with an auxiliary voltage proportional to the wattless current in the transmission line system to energize a condition-responsive voltage-actuated mechanism for regulating the field excitation of the alternator. These arrangements have the disadvantage that they can control only for a given constant value of wattless current. In the control system according to the invention, which overcomes this disadvantage, alternators in parallel operation can be controlled according to a program of active to inactive (wattless) current components. The invention is characterized in that the auxiliary voltage is derived from the load current through the use of a series circuit of ohmic and reactive impedances which, in order to produce the time-to-time desired functional interdependence between active and wattless currents of the alternator, are selectively switched in and out of the series circuit.

It is, therefore, an object of my invention to provide a voltage regulator for alternators connected in parallel that automatically and reliably maintains any desired and predetermined functional relationship between the power component and the wattless component in each alternator within the normal load range and during normal steady-state operation, regardless of fluctuations in line voltage.

Figure 2:
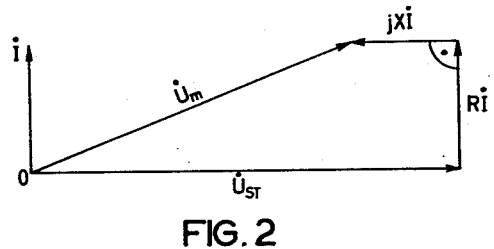
Figure 3:
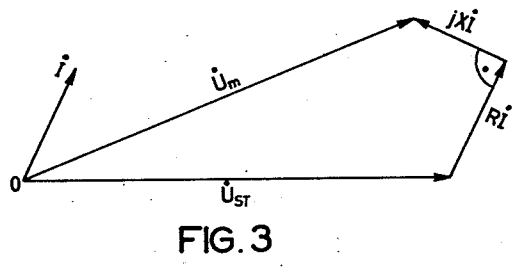

In the drawings:

Fig. 1 is a schematic diagram illustrating a control circuit embodying the invention, Fig. 2 is a vector diagram of the voltages effective in the condition-responsive device for controlling the alternator upon the occurrence of an in-phase or active current load, and Fig. 3 is a vector diagram of the voltage effective in the condition-responsive device for controlling the alternator at the normal steady state condition of operation.

In Fig. 1 a three-phase alternator 2, excited by an excitator 3, is shown connected with a three-phase feeder system 1. The field winding 31 of exciter 3 is connected through a voltage regulator 4 to a source 5 of constant direct voltage. The voltage regulator 4 may have any of the known and suitable designs. According to the illustrated example, the regulator is equipped with a potentiometer rheostat 41 whose slider 42 is actuated by a condition-responsive mechanism (measuring mechanism). The control coil 43 of the regulator mechanism is connected in a control circuit which comprises a group 6 of variable impedance elements, namely a resistor 61, an inductance coil 62 and a capacitor 63. The control circuit is connected across a tapped-off portion of a potentiometer rheostat 7 which impresses upon the control circuit an adjusted datum voltage. Rheostat 7 is connected across the output side of a voltage stabilizer 8 which is connected to the line 1 by a voltage transformer 9. The stabilizer 8 impresses upon the control rheostat 7 a constant voltage regardless of fluctuations of the line voltage as long as the line voltage stays within given limits, that is, during the normal steady-state operation of the system.

The set 6 of impedance elements is traversed by a superimposed current supplied from a current transformer 10 connected with the line 1. A shunt connection 11 with respective contacts 64, 65, 66 permits a selective short-circuiting of the respective elements 61, 62, 63 of the set of regulating impedances. The contacts 64, 65, 66 may be controlled manually or automatically in dependence upon a desired regulation or control program. The regulating device primarily controls the excitation field winding 31 of the auxiliary exciter machine 3. This machine, in turn, controls the field excitation of the alternator 2.

The apparatus operates as follows. The astatic measuring mechanism of regulator 4 is in equilibrium at a given line voltage determined by the datum voltage to which the control member 7 is adjusted. The mechanism has the effect of controlling an additional or corrective voltage from source 5 in dependence upon the current flowing from current transformer 10 through the set 6 of impedance elements. The excitation of the regulator 4, that is the setting of the control member 7, may be chosen, for instance, so that no wattless (reactive) current is supplied to the line. The prime mover or other driving machine (not shown) of the alternator 2 may also be so regulated or set that at first no power (active) current is supplied into the line. When thereafter the active current is varied to a finite value by a corresponding control of the alternator drive, a voltage change becomes effective upon the control circuit of the regulator 4 in such a manner that the active current flowing through the impedance device 6 geometrically adds a voltage component to the constant voltage which the control member 7 impresses upon the control circuit. The added voltage component is dependent upon the selected setting or insertion of the impedance members 61, 62, 63.

In Figs. 2 and 3, the output voltage $\hat{U}_{ST}$ from voltage stabilizer 8 is shown as a horizontal vector. If the load current should increase in one of the main conductors R, for instance, of the driven alternator, this current will result in voltage components $R\hat{I}$ and $jX\hat{I}$ in the resistor 61 and inductor 62 respectively (assuming that the capacitor 63 is shorted out by switch 66). In Fig. 2 the load current $\hat{I}$ extends perpendicularly from the zero point of stabilizer voltage $\dot{U}_{ST}$ and the voltage component $R\dot{I}$ is shown to be parallel to the current vector $\dot{I}$ at the end of voltage vector $\dot{U}_{ST}$. The voltage component $jX\dot{I}$ extends from the end point of vector $R\dot{I}$ parallel to the vector $\dot{U}_{ST}$. The interconnection of the zero point of $\dot{I}$ with the end of the vector $jX\dot{I}$ gives the value $\dot{U}_m$ of the voltage applied to the control coil 43 of the condition responsive device 4. Since the condition responsive device 4 was in balance before the occurrence of the load current, i. e., since at that time $\dot{U}_m$ was equal to $\dot{U}_{ST}$, now the excitation current of the exciter 3 must increase to such a value that, as seen in Fig. 3, the absolute value of the voltage applied to the control coil 43 has again reached the absolute value of the voltage $\dot{U}_{ST}$. This modifies the excitation of the alternator to insure at the same time that the cosine $\varphi$ is held constant independently of voltage variation in any one of the driven machines.

However, a definite desired reactive current may also be adjusted at the datum-voltage member 7 prior to the occurrence of the active current. That is, the setting described above for an initial reactive current of zero magnitude and for an increasing magnitude of the active current may also be effected for any other desired initial magnitude of reactive current so that various other desired correlations of active current and reactive current may be obtained.

The desired regulating program is predicated upon maintenance of a constant voltage at the voltage-responsive control mechanism of the regulator. The constant-voltage supply unit 8 serves to secure this desired constancy of the regulator input voltage irrespective of changes in the voltage level of the line, since otherwise an additional variation in reactive current may occur. Such an additional variation may disturb the regulating program and may also lead to excessively high reactive currents in the alternator in the event of large changes in line voltage. In summary: I connect the condition-responsive control circuit of a field-voltage regulator with the alternating-current line energized by the alternator being regulated, through such means that the control circuit has impressed upon it a datum voltage of a given phase relation to the line voltage; and I further provide the control circuit with selectively insertable impedance means that include reactive components, and superimpose on the impedance means a current dependent upon the line current. It is well understood in this field that the voltage stabilizers have the function of maintaining a constant value of the effective (root mean square) magnitude of the alternating output voltage irrespective of small fluctuations of the line voltage. Reference is made in this relation to the textbook Electronics in Industry by G. C. Chute, p. 437, McGraw-Hill, of 1946, and to the paper by J. A. Uttal on Voltage Stabilizers in Electronic Industries, August 1945, pages 90-94, 150, 154, 158, and to German Patent 749,486 of November 23, 1944. Voltage stabilizers which impress a datum voltage of a given phase relation to the line voltage are employed. Many such are known to the art.

Apparatus according to the invention may be equipped with auxiliary means which initiate the voltage-stabilizing operation of the constant-voltage supply unit 8 only after the elapse of a given period of time following the occurrence of a change in line voltage.

I claim:

1. In a power distribution system, apparatus for the regulation of an alternator operating in parallel with other alternators on the same feeder line for feeding the same, to maintain a predetermined functional relation between the active power component and the wattless power component of the alternator output, comprising means for deriving a datum voltage from the feeder line whose magnitude is kept constant for a given range of the line voltage, and is of a given phase relation to the line voltage, voltage regulator means, circuit means to impress the constant datum voltage on the voltage regulator, impedance means comprising resistance and reactance elements connected in said circuit means, current imposing means operatively connected to and energized by the feeder line and connected to the impedance means to impress therethrough a current varying with and dependent upon the feeder line current, the voltage regulator means including a control instrumentality which is energized by the agency of the current in said circuit means, which instrumentality is operatively connected to control the field of the alternator.

2. In a power distribution system, apparatus for the regulation of an alternator operating in parallel with other alternators on the same feeder line for feeding the same, to maintain a predetermined functional relation between the active power component and the wattless power component of the alternator output, comprising means for deriving a datum voltage from the feeder line whose magnitude is kept constant for a given range of the line voltage, and is of a given phase relation to the line voltage, voltage regulator means, circuit means to impress the constant datum voltage on the voltage regulator, impedance means comprising resistance and reactance elements connected in said circuit means, current imposing means operatively connected to and energized by the feeder line and connected to the impedance means to impress therethrough a current varying with and dependent upon the feeder line current, the voltage regulator means including a control instrumentality which is energized by the agency of the current in said circuit means, which instrumentality is operatively connected to control the field of the alternator, the feeder line being a three phase transmission line and the means for deriving a substantially constant datum voltage being energized through connections across two phases of the three phase line.

3. In a power distribution system, apparatus for the regulation of an alternator operating in parallel with other alternators on the same feeder line for feeding the same, to maintain a predetermined functional relation between the active power component and the wattless power component of the alternator output, comprising stabilizer means for deriving a datum voltage from the feeder line whose magnitude is kept constant for a given range of the line voltage, and is of a given phase relation to the line voltage, voltage regulator means, circuit means to impress the constant datum voltage on the voltage regulator, impedance means comprising resistance and reactance elements connected in said circuit means, current imposing means operatively connected to and energized by the feeder line and connected to the impedance means to impress therethrough a current varying with and dependent upon the feeder line current, the voltage regulator means including a control instrumentality which is energized by the agency of the current in said circuit means, which instrumentality is operatively connected to control the field of the alternator, and means for selectively switching the resistance and reactance elements in and out of the circuit means to provide a desired regulation program.

4. In a power distribution system, apparatus for the regulation of an alternator operating in parallel with other alternators on the same feeder line for feeding the same, to maintain a predetermined functional relation between the active power component and the wattless power component of the alternator output, comprising means for deriving a datum voltage from the feeder line whose magnitude is kept constant for a given range of the line voltage, and is of a given phase relation to the line voltage, voltage regulator means, circuit means to impress the constant datum voltage on the voltage regulator, impedance means comprising resistance and reactance elements connected in said circuit means, current imposing means operatively connected to and energized by the feeder line and connected to the impedance means to impress therethrough a current varying with and dependent upon the feeder line current, the voltage regulator means including a control instrumentality which is energized by the agency of the current in said circuit means, which instrumentality is operatively connected to control the field of the alternator, the feeder line being a three phase transmission line and the means for deriving a substantially constant datum voltage being energized through connections across two phases of the three phase line, and means for selectively switching the resistance and reactance elements in and out of the circuit means to provide a desired regulation program.

5. In a power distribution system, apparatus for the regulation of an alternator operating in parallel with other alternators on the same feeder line for feeding the same, to maintain a predetermined functional relation between the active power component and the wattless power component of the alternator output, comprising stabilizer means for deriving a datum voltage from the feeder line whose magnitude is kept constant for a given range of the line voltage, and is of a given phase relation to the line voltage, voltage regulator means, circuit means connected to impress the constant datum voltage on the voltage regulator, a current transformer coil energized by the feeder line, impedance means comprising resistance and reactance elements connected in said circuit means, the transformer coil being connected across the impedance means to impose thereon a current dependent upon and varying with the feeder line current, the voltage regulator means including a control instrumentality energized by the current in said circuit means, which instrumentality is operatively connected to control the field strength of the alternator.

6. The apparatus defined in claim 5 in which the impedance means comprises resistance, inductance, and capacitance elements and means for connecting any number of the latter elements in and out of the circuit means.

7. The apparatus defined in claim 3 in which the reactance comprises an inductance element, and a capacitance element.

8. The apparatus defined in claim 1 in which the reactance elements comprise an inductance element and a capacitance element in series with the resistance element.

9. The apparatus defined in claim 2 in which the reactance elements comprise an inductance element and a capacitance element in series with the resistance element.

References Cited in the file of this patent

UNITED STATES PATENTS

| | | |
|---|---|---|
| 1,847,585 | Ytterberg | Mar. 1, 1932 |
| 2,136,248 | McLachlan | Nov. 8, 1938 |
| 2,478,623 | Crary et al. | Aug. 9, 1949 |